Patented Aug. 29, 1944

2,356,776

UNITED STATES PATENT OFFICE 2,356,776

COMPOSITION FOR PREPARATION OF OIL BASE DRILLING FLUID

George Miller, San Marino, Calif., assignor to Demont G. Miller, Los Angeles County, Calif.

No Drawing. Application June 16, 1942, Serial No. 447,298

5 Claims. (Cl. 252—8.5)

This invention relates to a composition to be used in the preparation of an oil base drilling fluid.

It is a general object of the present invention to provide a powdered mixture of materials which requires only the addition of a suitable oil base and a slight amount of water to produce an oil base drilling fluid of exceptionally satisfactory character.

An oil base drilling fluid should include, in addition to the oil base, a weight material, an ingredient or ingredients for providing plastering properties, and an ingredient or ingredients for developing the proper gel properties. In order to produce a suitable oil base drilling fluid, these several added ingredients must be properly distributed through the base.

The present invention provides a composition containing all of the ingredients necessary to add to an oil base in order to convert said oil base into a satisfactory oil base drilling fluid, and furthermore provides these ingredients in a form which facilitates and insures the production of an improved oil base drilling fluid.

It is usually desirable that an oil base drilling fluid have a weight range of between 68 and 90 pounds per cubic foot, and to provide the proper weight range the composition of the present invention includes a weight material, such for example as crushed oyster shells, limestone, barytes, etc. An oil base drilling fluid should also include a material to provide plastering properties to the drilling fluid, and for the purpose of providing such plastering properties the composition of the present invention includes asphalt. Preferably, the asphalt employed should be of the type described and claimed in my copending application, Serial No. 407,905, filed on August 22, 1941. As pointed out in said copending application, by the selection of the proper asphalt not only are desirable plastering properties imparted to the drilling fluid but the gel properties of the drilling fluid may be materially improved.

The bottom-hole temperatures of many wells now being drilled are in excess of 200° F., and in order to provide an oil base drilling fluid satisfactory for operation in wells having such high bottom-hole temperatures it is important to employ in the oil base drilling fluid an asphalt which will impart to the drilling fluid improvements in the gel properties of the drilling fluid. The gel strength of the drilling fluid containing asphalt as the plastering agent is governed in part by the melting point of the asphalt employed. Apparently, the gel strength of the drilling fluid becomes unsatisfactory whenever the drilling fluid is raised to a temperature close to the melting point of the asphalt employed. As a general rule, the penetration of asphalt decreases as its melting point is raised. As the penetration of asphalt decreases, its plastering properties decrease. As pointed out in said copending application, by careful selection of stocks and control of blowing technique it is possible to produce air-blown asphalts having penetrations of around 6 to 14 at 25° C. with melting points of 310 to 260° F., which asphalts are sometimes referred to as rubbery in nature, and asphalts of such character are preferably employed in producing the composition of the present invention.

The composition of the present invention also includes an additional agent which has in the composition a number of important functions. This additional ingredient is calcium oxide. Calcium oxide when slaked with water forms calcium hydroxide, which operates in the oil base drilling fluid produced by the use of the composition to act as an auxiliary gel-imparting ingredient. It thereby facilitates holding up the weight material of the drilling fluid and suspending the cuttings produced in the drilling operations. In this respect, calcium hydroxide is a superior reagent to any previously employed, particularly in that its gel-imparting properties are less susceptible to change upon change in temperature of the drilling fluid. The calcium oxide used in the composition of the present invention has, however, other important functions. By the use of an excess of calcium oxide over that which is to be initially converted into calcium hydroxide, the excess calcium oxide utilized imparts to the oil base drilling fluid automatic regeneration properties. During the use of an oil base drilling fluid it normally becomes gradually contaminated with water, and, as the water contamination in the drilling fluid gradually increases, it progressively loses many of its valuable properties. When the composition of the present invention includes an excess of calcium oxide, such excess of calcium oxide acts in the drilling fluid merely as additional weight material until there is a tendency of the drilling fluid to become contaminated with water. Any such water which may be picked up from the formation by the drilling fluid then reacts automatically with the excess or a part of the excess of calcium oxide to produce additional calcium hydroxide, thereby removing or preventing the water contamination of the drilling fluid and preserving all of the valuable attributes and properties of the original drilling fluid uncontaminated with excess water.

Finally, and of utmost importance to the composition of the present invention, is the function of the calcium oxide in the composition in facilitating the preparation of the drilling fluid. When water is added to calcium oxide, the calcium oxide reacts or slakes violently with the water, liberating a great deal of heat. The composition of the present invention utilizes in a most beneficial manner this property of calcium oxide.

In accordance with the present invention, the necessary ingredients for producing the most desirable form of oil base drilling fluid, i. e., a weight material, the correct type or types of asphalt, and calcium oxide, are prepared as an intimate powdered mixture, so that all that is required in order to produce an oil base drilling fluid is to add such powdered mixture to a suitable oil containing a small amount of water. The calculated quantity of water should be present in the oil in order to just combine with so much of the calcium oxide or the composition as is required to produce the calcium hydroxide intended to be included in the drilling fluid upon its initial production.

When the powdered composition of the present invention is added to an oil containing such a calculated quantity of water, the properties of the calcium oxide in slaking violently with the water and in liberating a great deal of heat greatly facilitate dispersion of the weight material and asphalt in the oil base drilling fluid and insure the dispersion of these ingredients in the most desirable manner. The utilization of this property of calcium oxide in slaking violently when brought in contact with water as a means of insuring dispersion of weight material and asphalt in an oil base drilling fluid have been found to very materially decrease the labor necessary in the production of an oil base drilling fluid.

The following are preferred examples of compositions embodying the present invention:

While various weight materials may be employed, I have employed in one example of the invention limestone as the weight material. The limestone is ground or powdered in any usual or preferred manner, the majority of the weight material being powdered separately from the powdering of the remainder of the ingredients. In a similar manner, the calcium oxide to be employed in the composition is separately powdered. The asphalt which is employed in the composition due to its high melting point and particular properties is also capable of being ground to a powder, for which purpose it may be ground, for example, in a hammer mill. In order to facilitate grinding of the asphalt in a hammer mill, a small proportion—say 10% by weight—of the weight material is added to the asphalt. After powdering these several ingredients in the manner described, they are then mixed together to form a powdered mixture. A preferred powdered mixture is one containing 66% by weight of the weight material or limestone, 26% by weight of the blown asphalt or mineral rubber, and 8% by weight of calcium oxide.

In order to produce an oil base fluid of such a powdered composition, I add, for example, to 100 parts by weight of the powdered composition approximately 100 parts by weight of a suitable oil base, such as stove oil or gas oil. I also add approximately two parts by weight of water. The amount of water added is sufficient to combine with or slake about three-fourths of the calcium oxide employed and has the effect of insuring a rapid and complete dispersion of the weight material and asphalt in the stove oil or gas oil. The remaining excess calcium oxide of the composition serves to prevent or at least materially reduce the water contamination of the drilling fluid upon a subsequent utilization in a well-hole. The drilling fluid resulting from the use of this composition is capable of satisfactory operations in well-holes having bottom-hole temperatures in excess of 260° F. Where the drilling fluid is to be used at extremely high temperatures, it may be found preferable to utilize the following example of the invention:

As pointed out in the aforesaid copending application, it is very difficult, if not impossible, even by selection of stocks and careful air-blowing technique to produce air-blown asphalts having melting points, for example, above 350° F., which possess satisfactory plastering properties. On the other hand, certain natural asphalts having extremely high melting points contribute very satisfactory plastering properties to oil base drilling fluids, although not contributing or possessing any satisfactory gel properties. By mixing natural asphalts, such as gilsonite, glance pitch, some types of grahamite, natural lake asphalts, etc., with certain high melting point air-blown asphalts, a mixed asphalt is derived having both satisfactory plastering properties and gel properties, even when the drilling fluid is heated to high temperatures, say above 280° F. Accordingly, in the second example of the present invention, I grind together, for example, in a hammer mill with the addition of a small amount of weight material an air-blown asphalt and natural asphalt, and add this ground mixture to separately ground weight material, such as limestone, and to the separately ground or powdered calcium oxide in the proportions indicated in the first example, or in any desired or preferred proportions.

The invention is of the scope set forth in the appended claims.

I claim:

1. A composition for use in preparing an oil base drilling fluid, which composition consists of a powdered mixture of weight material, calcium oxide, and asphalt.

2. A composition for use in preparing an oil base drilling fluid, consisting of a powdered mixture of weight material, calcium oxide, and an asphalt, the asphalt having a penetration of from 6 to 14 and a melting point of 310 to 260° F.

3. A composition for the preparation of an oil base drilling fluid, said composition consisting of an intimate solid mixture of finely divided weight material, a high melting air-blown asphalt and a natural asphalt, and calcium oxide.

4. A powdered mixture for preparation of an oil base drilling fluid upon addition of the oil base, consisting of an intimate mixture of finely divided weight material, the air-blown asphalt having a penetration of 14 to 6 at 25° C. and a melting point of 260 to 310° F., a natural asphalt, and calcium oxide.

5. A composition of matter containing powdered limestone, powdered air-blown asphalt, and powdered calcium oxide in sufficient quantities to quickly disperse the powdered limestone and asphalt in an oil base containing a slight amount of water.

GEORGE MILLER.